(12) United States Patent
Latheef et al.

(10) Patent No.: US 11,418,987 B2
(45) Date of Patent: Aug. 16, 2022

(54) METHOD FOR REPORTING LATENCY OF PACKET TRANSMISSION IN COMMUNICATION NETWORK

(71) Applicant: Samsung Electronics Co., Ltd., Gyeonggi-do (KR)

(72) Inventors: Fasil Abdul Latheef, Bangalore (IN); Neha Sharma, Bangalore (IN)

(73) Assignee: Samsung Electronics Co., Ltd

(*) Notice: Subject to any disclaimer, the term of this patent is extended or adjusted under 35 U.S.C. 154(b) by 0 days.

(21) Appl. No.: 16/577,400

(22) Filed: Sep. 20, 2019

(65) Prior Publication Data

US 2020/0022012 A1    Jan. 16, 2020

Related U.S. Application Data

(63) Continuation of application No. 15/744,572, filed as application No. PCT/KR2016/009265 on Aug. 22, 2016, now abandoned.

(30) Foreign Application Priority Data

Aug. 21, 2015   (IN) ..................... 4399/CHE/2015 PS
Aug. 18, 2016   (IN) ..................... 4399/CHE/2015 CS

(51) Int. Cl.
*H04W 24/10*     (2009.01)
*H04L 43/087*    (2022.01)
(Continued)

(52) U.S. Cl.
CPC .......... *H04W 24/10* (2013.01); *H04L 43/087* (2013.01); *H04L 43/0852* (2013.01);
(Continued)

(58) Field of Classification Search
CPC ..... H04W 24/10; H04W 24/02; H04W 24/08; H04L 43/0852; H04L 43/087; H04L 41/0813
See application file for complete search history.

(56) References Cited

U.S. PATENT DOCUMENTS

2009/0103478 A1* 4/2009 Sammour ............. H04L 69/324
                                                    370/328
2010/0034170 A1  2/2010 Hirano et al.
(Continued)

FOREIGN PATENT DOCUMENTS

EP    2875691 B1 * 10/2019 ............ H04W 76/23
KR    1020120111358     10/2012
(Continued)

OTHER PUBLICATIONS

CMCC et al. R2-153191, "Way forward on UL delay measurement", 3GPP TSG-RAN WG2 Meeting #91, Beijing, China, Aug. 24-28, 2015, available from Aug. 15, 2015 at https://www.3gpp.org/ftp/tsg_ran/WG2_RL2/TSGR2_91/Docs (Year: 2015).*
(Continued)

*Primary Examiner* — Anh Ngoc M Nguyen
(74) *Attorney, Agent, or Firm* — The Farrell Law Firm, P.C.

(57) ABSTRACT

Methods and apparatuses are provided for reporting latency of an uplink packet transmission in a communication network. A UE triggers an event for time stamping of an uplink packet. The UE identifies information on first arrival time of the uplink packet at a lower layer entity of the UE from a transmit entity of the UE, based on the triggering of the event for time stamping of the uplink packet. The UE transmits the uplink packet including the information to the network entity.

12 Claims, 16 Drawing Sheets

(51) Int. Cl.
  *H04L 43/0852* (2022.01)
  *H04W 24/08* (2009.01)
  *H04L 41/0813* (2022.01)
  *H04W 24/02* (2009.01)

(52) U.S. Cl.
  CPC ......... *H04L 41/0813* (2013.01); *H04W 24/02* (2013.01); *H04W 24/08* (2013.01)

(56) References Cited

U.S. PATENT DOCUMENTS

| | | | |
|---|---|---|---|
| 2013/0077517 A1* | 3/2013 | Cho | H04W 76/15 370/252 |
| 2013/0165122 A1 | 6/2013 | Tanaka | |
| 2013/0286865 A1 | 10/2013 | Johansson et al. | |
| 2014/0254398 A1 | 9/2014 | Li et al. | |
| 2017/0034025 A1* | 2/2017 | Kollar | H04W 28/0268 |
| 2018/0084451 A1 | 3/2018 | Fukuta | |
| 2019/0007291 A1* | 1/2019 | Yi | H04L 69/22 |

FOREIGN PATENT DOCUMENTS

| | | | |
|---|---|---|---|
| WO | WO 2014/084499 | 6/2014 | |
| WO | WO-2017026687 A1 * | 2/2017 | .......... H04W 12/033 |

OTHER PUBLICATIONS

PCT/ISA/210 Search Report issued on PCT/KR2016/009265 (pp. 3).

PCT/ISA/237 Written Opinion issued on PCT/KR2016/009265 (pp. 6).

3GPP TSG-RAN WG2 Meeting #92, Anaheim, USA, Nov. 16-20, 2015, New MDT measurement introduced by feMDT, pp. 8.

3GPP TSG-RAN2 Meeting #92, Anaheim, USA, Nov. 16-20, 2015, Introduction of Rel-13 MDT enhancements, pp. 32.

3GPP TSG-RAN2 Meeting #93, St. Julian's, Malta, Feb. 15-19, 2016, Futher clarifications on Rel-13 MDT enhancements, pp. 49.

* cited by examiner

| D/C | L | R | R | PDCP SN | | | OCT 1 |
|---|---|---|---|---|---|---|---|
| PDCP SN (cont...) | | | | | | | OCT 2 |
| SFN | | | | | | | OCT 3 |
| SFN | | Subframe | | | R | R | OCT 4 |
| Data | | | | | | | OCT 5 |

FIG.10A

| D/C | PDCP SN | | | OCT 1 |
|---|---|---|---|---|
| L | SFN | | | OCT 2 |
| SFN | Subframe | | R | OCT 3 |
| Data | | | | OCT 4 |

FIG.10B

| D/C | PDU type | R | R | R | R | OCT 1 |
| R | R | SFN | | | | OCT 2 |
| SFN | | SF | | | | OCT 3 |

FIG.12

| D/C | PDU type | R | R | R | R | OCT 1 |
|---|---|---|---|---|---|---|
| Number of packets discarded with assigned | | | | | | OCT 2 |
| PDCP SN | | Number of packets | | | | OCT 3 |
| Discarded without assigned PDCP SN | | | | | | OCT 4 |

FIG.14A

| D/C | PDU type | Number of packets | OCT 1 |
|---|---|---|---|
| Discard (with/without SN) | | | OCT 2 |

FIG.14B

METHOD FOR REPORTING LATENCY OF PACKET TRANSMISSION IN COMMUNICATION NETWORK

PRIORITY

This application is a Continuation Application of U.S. application Ser. No. 15/744,572, filed in the U.S. Patent and Trademark Office on Jan. 12, 2018, which is a National Phase Entry of International Application No. PCT/KR2016/009265, filed on Aug. 22, 2016, and claims priority to Indian Provisional Application No. 4399/CHE/2015 PS, filed Aug. 21, 2015, and Indian Complete Patent Application No. 4399/CHE/2015 CS, filed Aug. 18, 2016, the content of each of which is incorporated herein by reference.

FIELD

The present invention relates to wireless communication network and more particularly relates to a mechanism for reporting latency of a packet transmission in a communication network.

BACKGROUND

Minimization of Drive Test (MDT) is introduced in third generation partnership project (3GPP) to reduce the rigorous drive tests done by operators to collect network (NW) performance metrics in their network for the NW optimization. The MDT significantly reduces the NW maintenance costs for the operators, ensures faster optimization cycle resulting in higher customer satisfaction and nonetheless help to reduce the carbon emission to protect the environment. Furthermore, it enables operators to collect measurements from areas which are not accessible for drive tests (e.g. narrow roads, forests, private land/house/office).

The MDT is a mechanism to provide feedback to an eNodeB (eNB) about the network performance and its impact on User Equipment(s) (UEs) served by the corresponding network. As provisioned in the current specification 3GPP TS 36.331, the MDT supports reporting of radio link related statistics to the NW. Based on these reports the eNB or the NW may perform some corrective actions in order to minimize the failure from recurring frequently and thereby improving the service quality. The 3GPP Release 11 MDT is aimed at defining methods in context of quality of service (QoS) verification. Measuring end user QoS focused on measurement of bit rate for non-guaranteed bit rate (NGBR) type data statistics only.

However, these mechanisms are beneficial only to the non-guaranteed bit rate kind of traffic and do not suit GBR traffic in a similar way (e.g. Multimedia Telephony (MM-TEL) Voice/video services). Most operators use the GBR type traffic to provide the MMTEL voice/video services. Therefore, the MDT mechanisms have to be enhanced to provide efficient support of MMTEL voice/video type traffic statistics. 3GPP has introduced new study item. Further the MDT enhancements in the 3GPP release 13 with a focus of providing solution for enhanced QoS verification which cover latency and packet drop or loss metrics and enhanced coverage optimization for MMTEL services which covers the impact on MDT measurements due to Inter-Cell Interference Coordination (ICIC) and Enhanced Inter-Cell Interference Coordination (eICIC).

The GBR traffic like MMTEL voice/video is real time in nature and is error tolerant but are non-delay tolerant services. In addition to jitters, the quality of the voice/video service depends largely on the end to end latency in communication. The 3GPP recommended latency values for voice/video real time services are shown in Table 1 below:

TABLE 1

| Medium | Application | Degree of symmetry | Data rate | Key performance parameters and target values | | |
|---|---|---|---|---|---|---|
| | | | | End-to-end One-way Delay | Delay Variation within a call | Information loss |
| Audio | Conversational voice | Two-way | 4-25 kb/s | <150 msec preferred <400 msec limit Note 1 | <1 msec | <3% FER |
| Video | Videophone | Two-way | 32-384 kb/s | <150 msec preferred <400 msec limit Lip-synch: <100 msec | | <1% FER |

Therefore, mechanisms to improve quality of the GBR services have to be introduced. The GBR services are generally real time in nature and are error tolerant but non-delay tolerant services. Therefore, the quality of these real time services depends on how the delay and errors are getting affected.

Latency is one of the important metric for QoS verification especially for GBR services or MMTEL services which are real time and impact the end user experience. This metric can really help in improving the NW performance by improving the NW capacity. The various reasons for Latency can be as below:

Insufficient UL grants from the network for transmitting the generated voice/video packet Weak UL channel from the transmitting UE to the network leading to packet drops over the air interface and increasing number of retransmissions Layer 3 Communication latency in carrying the traffic from the eNB connected to the transmitting UE to the eNB connected to the receiving UE Weak DL channel from the receiving eNB to the UE attempting to receive these packets in DL.

eNB not scheduling the receiving UE fast enough due to non-availability of resource/congestion/poor scheduling decisions.

Poor scheduling decisions or delay in allocation of resources for carrying voice/video traffic or other GBR traffic occur at different stages since the network is unaware of the latency/communication delay incurred during the process. According to 3GPP TS36.314, the packet delay in DL ["Packet Delay in the DL per QCI"] is measured by the eNB as the time difference between "the point in time when the last piece of Packet Data Convergence Protocol (PDCP) service data unit (SDU) was received by the UE according to received HARQ feedback information" and "the point in time when PDCP SDU arrives at the PDCP entity". The delay time measured by the eNB is not accurate in that:

The point in time when the UE receives a HARQ data and when the eNB receives the HARQ feedback are different, and;

HARQ reordering time, radio link control (RLC) processing time, and the PDCP processing time are not considered.

Therefore, the existing "DL (DL) packet delay measurement" is not suitable for measuring delay. Also, an UL(UL) delay/latency measurement is not defined in the TS36.314.

SUMMARY

The principal object of the embodiments herein is to provide a method for reporting latency of a packet transmission in a communication network.

Another object of the embodiments herein is to provide a method for receiving by an entity an UL packet from the UE at a first time unit, wherein the UL packet includes a second time unit at which the packet is sent from the UE.

Another object of the embodiments herein is to provide a method for measuring by the entity, latency in transmission of the packet based on a time difference between the first time unit and the second time unit.

Another object of the embodiments herein is to provide a method for performing by the entity at least one action based on the latency.

Another object of the embodiments herein is to provide a method for receiving by a UE, a DL packet from an entity at a first time unit, wherein the DL packet comprises a second time unit at which the packet is transmitted from the entity.

Another object of the embodiments herein is to provide a method for measuring by the UE a time difference between the first time unit and the second time unit for the DL packet.

Another object of the embodiments herein is to provide a method for reporting by the UE a latency report to the entity, wherein the latency report includes the time difference for transmission of the DL packet to the entity.

Another object of the embodiments herein is to provide a method for reporting a packet discard in a communication network includes logging by the UE a number of packets discarded and reporting by the UE a packet discard report including the number of packets discarded to the entity.

Another object of the embodiments herein is to provide a method for reporting a packet discard in a communication network includes receiving by the apparatus a packet discard report from the UE and performing at least one action based on the time difference.

Yet another object of the embodiments herein is to provide a method for measuring and calculating delay in both the DL and the UL directions for MMTEL services.

Yet another object of the embodiments herein is to provide a mechanism for determining UL latency by time stamping DL PDCP protocol data unit (PDU).

Yet another object of the embodiments herein is to provide a mechanism for determining DL latency by time stamping DL PDCP PDU.

Yet another object of the embodiments herein is to provide a mechanism for determining and reporting UL packet discard.

According to one embodiment, a method is provided for reporting latency of an uplink (UL) packet transmission in a communication network. A UE receives configuration information including a request message for reporting time information related to the UL packet transmission from a network entity. The UE identifies information on first arrival time of the UL packet at which the UL packet arrived at a transmit entity of the UE from a packet data convergence protocol (PRCP) upper service access point (SAP) of the UE in response to the request message. The UE transmits the UL packet including the information to the network entity.

According to another embodiment, a method is provided for identifying latency of an UL packet transmission in a communication network. A network entity transmits, to a UE, configuration information including a request message for reporting time information related to the UL packet transmission. The network entity receives, from the UE, the UL packet including information which includes an arrival time of the UL packet at which the UL packet arrived at a transmit entity of the UE from a PDCP upper SAP of the UE in response to the request message. The latency information is identified based on a difference between the arrival time and a completed processing time of the UL packet at the network entity. The information includes HARQ retransmissions, reordering delay, RLC retransmissions, RLC processing time, and PDCP processing time.

According to an additional embodiment, a UE is provided for reporting latency of an UL packet transmission in a communication network. The UE includes a transceiver, and a controller. The controller is configured to receive configuration information including a request message for reporting time information related to the UL packet transmission from a network entity. The controller is also configured to identify information including an arrival time of the UL packet at which the UL packet arrived at a transmit entity of the UE from a PDCP upper SAP of the UE in response to the request message. The controller is also configured to control the transceiver to transmit the UL packet including the information to the network entity.

According to a further embodiment, an apparatus is provided for identifying latency of an UL packet transmission in a communication network. The apparatus includes a transceiver and a controller. The controller is configured to control the transceiver to transmit, to a UE, configuration information including a request message for reporting time information related to the UL packet transmission. The controller is also configured to receive, from the UE, the UL packet including information which includes an arrival time of the UL packet at which the UL packet arrived at a transmit entity of the UE from a PDCP upper SAP of the UE. The controller is further configured to identify latency information that is based on a difference between the arrival time and a completed processing time of the UL packet at the apparatus. The latency information includes HARQ retransmissions, reordering delay, RLC retransmissions, RLC processing time, and PDCP processing time.

DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIGS. 10A-10B illustrate different PDU formats using which the PDCP data PDU are time stamped, according to embodiments as disclosed herein;

FIG. 12 illustrates the new PDCP control PDU introduced for indicating the time stamp to the UE, according to an embodiment as disclosed herein;

FIGS. 14A and 14B illustrate a PDCP UL discarded packet report control PDU, according to embodiments as disclosed herein;

DETAILED DESCRIPTION

Figure 1:
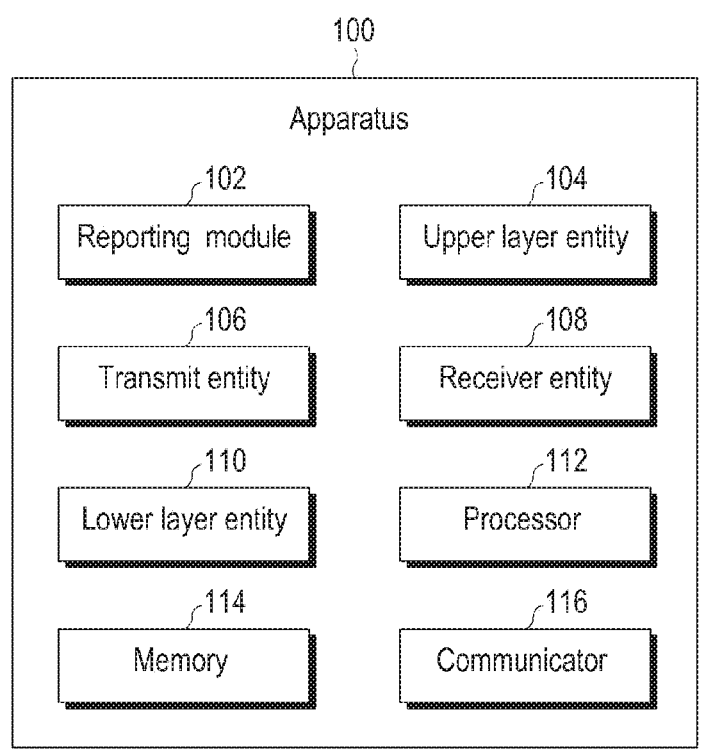
FIG. 1 illustrates block diagram of an apparatus, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide an apparatus for reporting latency of a packet transmission in a communication network. The apparatus includes a memory, a processor, coupled to the memory. The processor configured to receive an UL packet from a UE at a first time unit, wherein the UL packet comprises a second time unit at which the packet is sent from the UE. Further, the processor is configured to measure latency in transmission of the packet based on a time difference between the first time unit and the second time unit. Further, the processor is configured to perform at least one action based on the latency.

Accordingly, the embodiments herein provide a UE for reporting latency of a packet transmission in a communication network. The UE includes a memory, a processor coupled to the memory. The processor configured to receive a DL packet from an entity at a first time unit, wherein the DL packet comprises a second time unit at which the packet is transmitted from the entity. Further, the processor is configured to measure a time difference between the first time unit and the second time unit for the DL packet. Further, the processor configured report a latency report to the entity. The latency report includes the time difference for transmission of the DL packet.

Accordingly, the embodiments herein provide a UE for reporting latency of a packet transmission in a communication network. The UE includes a memory, a processor and an entity, coupled to the processor. The entity coupled to the processor configured to receive an UL packet from the UE at a first time unit, wherein the UL packet comprises a second time unit at which the packet is sent from the UE. Further, the processor configured to measure latency in transmission of the packet based on a time difference between the first time unit and the second time unit. Further, the processor configured to perform at least one action based on the latency.

Unlike conventional system, the proposed system and method can be achieved by reporting latency (For example: delay) of a packet transmission in a communication network (For example: UL (UL) and DL (DL)) or by facilitating the apparatus (for example: eNB) for measuring the delay (in UL). This will provide the eNB with knowledge about the accurate delay/latency measurements. With the accurate latency measurements, the network may be able to determine the time it takes for DL and UL communication so that the apparatus may take the necessary actions to prevent excessive delay in communication. The method can report the MMTEL call statistics to the network via an MDT to improve the service quality.

Referring now to the drawings, and more particularly to FIGS. 1 through 16, where similar reference characters denote corresponding features consistently throughout the figures, these are shown in preferred embodiments.

FIG. 1 illustrates block diagram of an apparatus 100, according to an embodiment as disclosed herein.

In an embodiment, the apparatus 100 includes a reporting module 102, an upper layer entity 104, a transmission entity 106, a receiver entity 108, lower layer entity 110, a processor 112 coupled to a memory 114 and a communicator 116. The apparatus 100 can include, for example, an eNB, evolved universal terrestrial access network (E-UTRAN), a pico cell, a macro cell, a network entity, an entity, or the like. The processor 112 may be for example; a hardware unit, a Central Processing Unit (CPU), a Graphics Processing Unit (GPU)) communicatively coupled to a memory 114 (e.g., a volatile memory and/or a non-volatile memory); the memory 114 includes storage locations configured to be addressable through the processor 112.

In an embodiment, the processor 112 can be configured to receive the UL packet from the UE at the first time unit. The first time unit corresponds to the time at which processing of the received packet is completed at the processor 112. The UL packet includes, for example, a second time unit at which the packet is sent from the UE. The second time unit corresponds to a time at which the packet is received by the processor 112. The reporting module 102 can be configured to measure the latency in transmission of the packet based on the time difference between the first time unit and the second time unit. Further, the reporting module 102 can be configured to perform one or more actions based on the latency.

For example, the one or more actions may include initiating/triggering preventive measures based on the measured latency. The preventive measures are conventionally known in the art.

The memory 114 may store the first time unit, the second time unit and the difference between the first time unit and the second time unit. The memory may also store the latency report which includes the difference between the first time unit and the second time unit. The memory unit 114 may include one or more computer-readable storage media. The memory 114 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 114 may, in some examples, be considered a non-transitory storage medium. The term "non-transitory" may indicate that the storage medium is not embodied in a carrier wave or a propagated signal. However, the term "non-transitory" should, not be interpreted to mean that the memory 114 is non-movable. In some examples, the memory 114 can be configured to store larger amounts of information than the memory. In certain examples, a non-transitory storage medium may store data that can, over time, change (e.g., in Random Access Memory (RAM) or cache).

Figure 2:
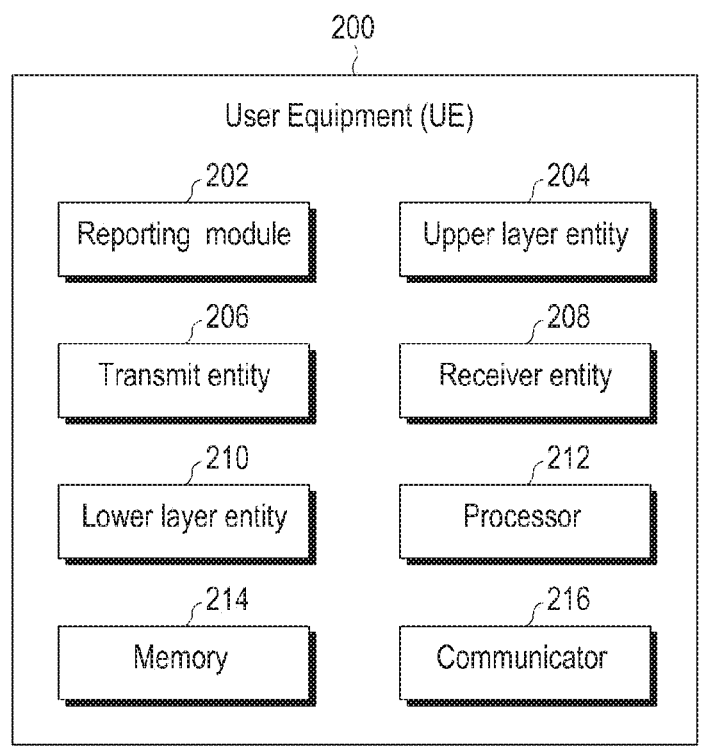
FIG. 2 illustrates block diagram of a UE, according to an embodiment as disclosed herein.

FIG. 2 illustrates block diagram of a UE 200, according to an embodiment as disclosed herein.

The UE 200 includes a reporting module 202, an upper layer entity 204, a transmit entity 206 (i.e., Tx entity), a receiver entity 208 (i.e., Rx entity), a lower layer entity 210, a processor 212 coupled to a memory 214 and a communicator 216. The UE 200 can include a mobile phone, a smart phone, Personal Digital Assistants (PDAs), a tablet, a phablet, a consumer electronic device, dual display devices, edge display device, electronic device, machine to machine device, or the like. The processor 212 may be for example; a hardware unit, a Central Processing Unit (CPU), a Graphics Processing Unit (GPU)) communicatively coupled to a memory 214 (e.g., a volatile memory and/or a non-volatile memory); the memory 214 includes storage locations configured to be addressable through the processor 212.

In an embodiment, the processor 212 can be configured to receive the DL packet from the apparatus 100 at the first time unit. The first time unit corresponds to the time at which processing of the received DL packet is completed at the UE 200. The DL packet includes the second time unit at which the packet is transmitted from the apparatus 100. The second time unit corresponds to the time at which the DL packet is arrived at the upper layer entity 204 of the apparatus 100 (for example, the entity). The reporting module 202 can be configured to measure a time difference between the first time unit and the second time unit for the DL packet. Further, the reporting module 202 can be configured to report the latency report to the apparatus 100. The latency report includes the time difference for transmission of the DL packet.

The memory 214 may store the first time unit, the second time unit and the difference between the first time unit and the second time unit. The memory may also store the latency report which includes the difference between the first time unit and the second time unit. The memory 214 may include one or more computer-readable storage media. The memory 214 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 214 may, in some examples, be considered a non-transitory storage medium. The term "non-transitory" may indicate that the storage medium is not embodied in a carrier wave or a propagated signal. However, the term "non-transitory" should not be interpreted to mean that the memory 214 is non-movable. In some examples, the memory 214 can be configured to store larger amounts of information than the memory. In certain examples, a non-transitory storage medium may store data that can, over time, change (e.g., in Random Access Memory (RAM) or cache).

Figure 3:
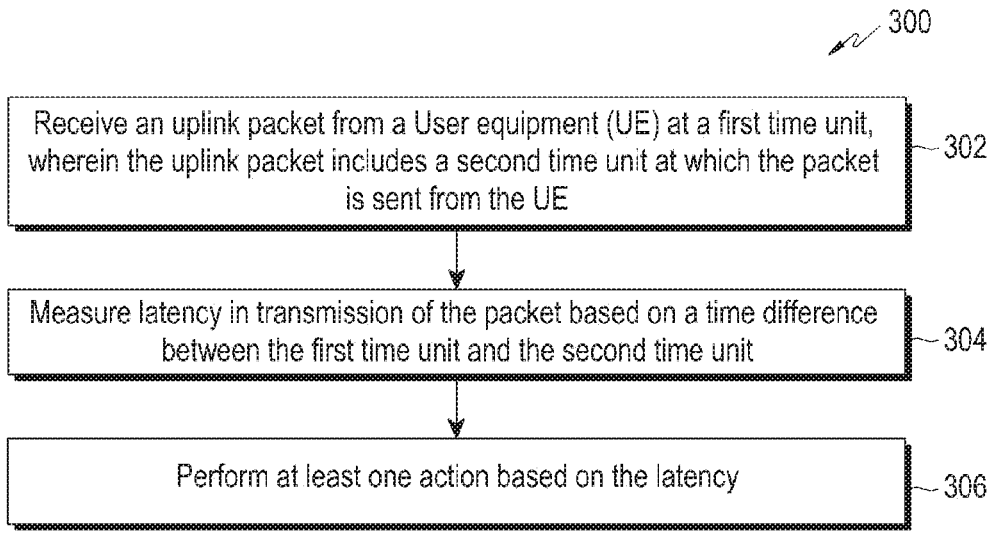
FIG. 3 is a flow diagram illustrating a method for reporting latency in a UL transmission, according to an embodiment as disclosed herein.

FIG. 3 is a flow diagram illustrating a method for reporting latency in a UL transmission, according to an embodiment as disclosed herein.

At step 302, the method includes receiving the UL packet from the UE 200 at the first time unit at which the packet is sent from the UE 200. In an embodiment, the method allows the reporting module 102 to receive the UL packet from the UE 200 at the first time unit at which the packet is sent from the UE 200. The UL packet also includes the second time unit, wherein the second time unit corresponds to the time at which processing of the received packet is completed and the packet is transmitted to a lower layer entity 110.

At step 304, the method includes measuring latency in transmission of the packet based on the time difference between the first time unit and the second time unit. In an embodiment, the method allows the reporting module 102 to measure the latency in transmission of the packet based on the time difference between the first time unit and the second time unit.

At step 306, the method includes performing at least one action based on the latency. In an embodiment, the method allows the reporting module 102 to perform at least one action based on the latency.

The various actions, acts, blocks, steps, or the like in the method of the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

Figure 4:
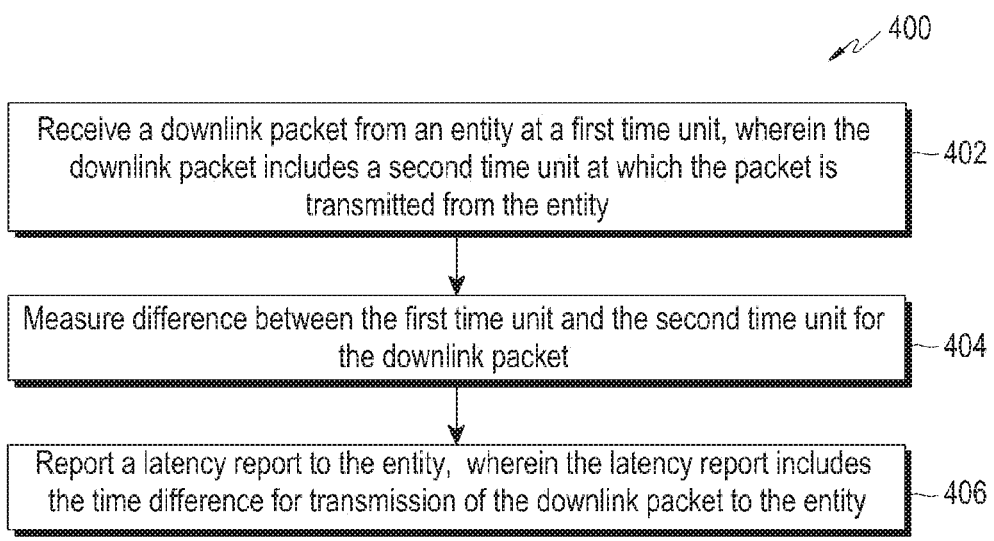
FIG. 4 is a flow diagram illustrating a method for reporting latency in a DL transmission to the apparatus, according to an embodiment as disclosed herein.

FIG. 4 is a flow diagram 400 illustrating a method for reporting latency in the DL transmission to the apparatus 100, according to an embodiment as disclosed herein.

At step 402, the method includes receiving the DL packet from the apparatus 100 at the first time unit. In an embodiment, the method allows the reporting module 202 to receive the DL packet from the apparatus 100 at the first time unit. The DL packet includes the second time unit at which the packet is transmitted from the apparatus 100.

At step 404, the method includes measuring the time difference between the first time unit and the second time unit for the DL packet. In an embodiment, the method allows the reporting module 202 to measure the time difference between the first time unit and the second time unit for the DL packet.

At step 406, the method includes reporting the latency report to the apparatus 100. In an embodiment, the method allows the reporting module 202 to report the latency report to the apparatus 100. The latency report includes the time difference for transmission of the DL packet.

In an embodiment, the method determines the DL latency by time stamping DL PDCPPDU. For example, in the DL the Tx entity 106 (i.e., PDCP) of the apparatus 100 receives packets from other network nodes or the S-GW (Serving Gateway). The start of an LTE packet air interface life cycle in the DL direction begins on its arrival at the PDCP for transmission related processing. Once the PDU is successfully transmitted in the DL to the UE 200 and the receiver entity 208 (i.e., PDCP) at the UE 200 is ready to provide the received PDU to the upper layer entity 204, a communication delay in the DL is calculated. The packet delay in the DL is measured by computing the time difference between the first time unit and the second time unit (i.e., "point in time PDCP SDU is provided to the upper layer entity 204 by the PDCP receiver entity 208 and "point in time when the PDCP SDU arrives at the PDCP Tx entity 106"). This latency measurement takes into account the HARQ retransmissions, reordering delay, the RLC retransmissions/RLC processing time and PDCP processing time as well. The measured delay/latency is then reported to the apparatus 100 for taking corrective actions.

Figure 5:
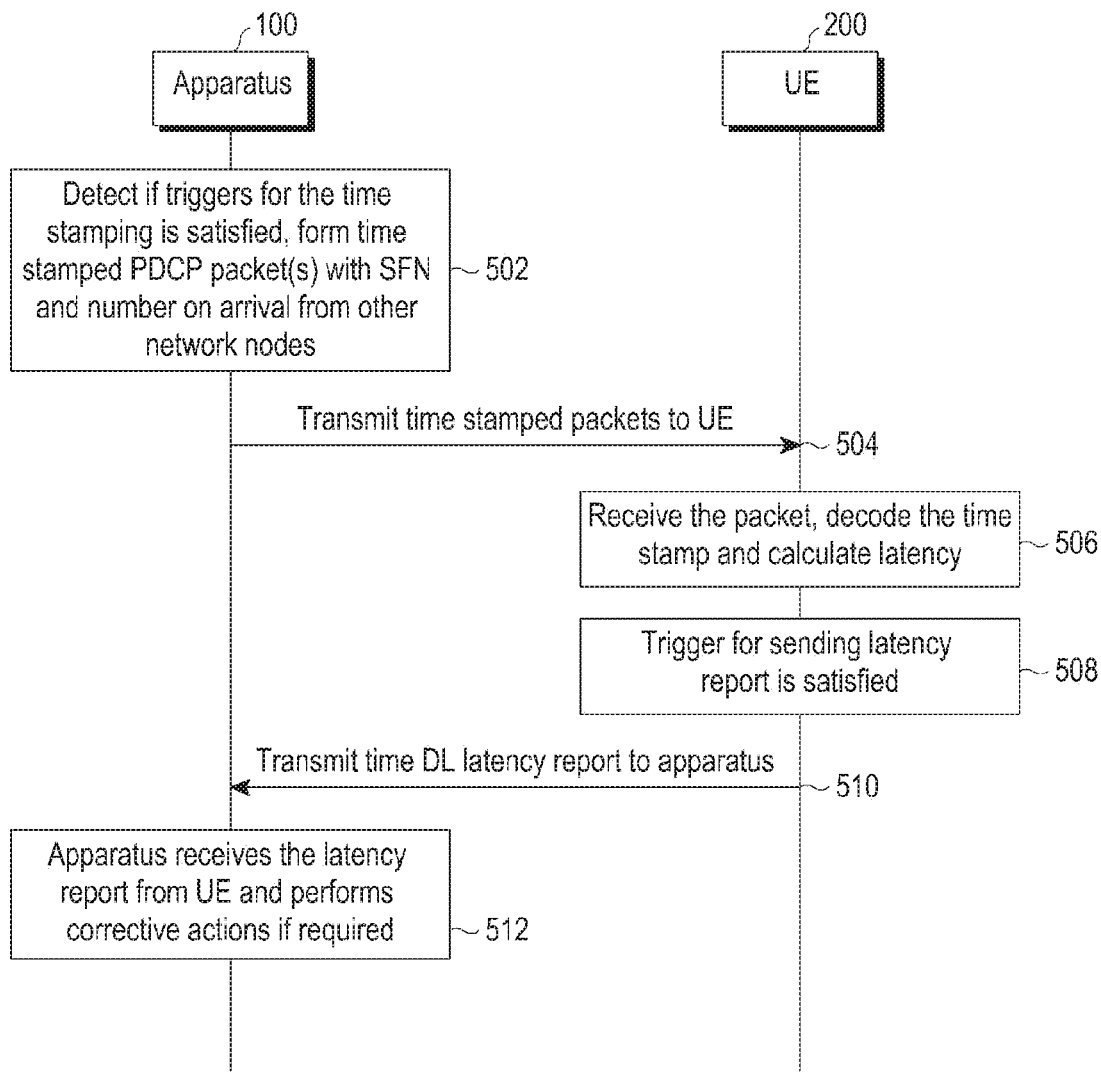
FIG. 5 is a sequence diagram illustrating various signaling messages involved in the DL latency determination, according to an embodiment as disclosed herein.

The various actions, acts, blocks, steps, or the like in the method of the flow diagram 400 may be performed in the order presented, in a different order or simultaneously. Further, in some embodiments, some of the actions, acts, blocks, steps, or the like may be omitted, added, modified, skipped, or the like without departing from the scope of the invention. FIG. 5 is a sequence diagram illustrating various signaling messages involved in the DL latency determination, according to an embodiment as disclosed herein. The Tx entity 106 (i.e., PDCP) of the apparatus 100 receives packets from other network nodes like S-GW. On arrival of PDCP SDU at the transmit entity 106, a reference time value is added to the packet/SDU/PDU. The PDCP SDU/PDU is time stamped (502) with the value of SFN and sf number at which the packet arrived from upper layer entity 104. For example, if the apparatus 100 detects that if the triggers for the time stamping are satisfied, then the apparatus 100 may time stamped PDCP packet(s) with the SFN and sf number, where the packets are arrived from other network nodes (i.e., S-GW). Therefore it is not always desirable to time stamp each of the PDCP DL PDU. The time stamping decision for a PDCU may depend on several factors and the triggers leading to decide time stamping of the PDU as are provided below:

Every DL packet

First DL packet on the bearer/QCI

For the zeroth DL PDCP SN

Periodic time stamping of SDU/PDU based on a defined periodicity

When first DL PDCP SDU is discarded from transmission

When DL PDCP SDU discard at NW (i.e., apparatus 100) PDCP Tx entity 106 increases over a threshold When the HARQ ACK is not received after a defined number of attempts/retransmissions.

When a status PDU is received from the UE 200.

Once the packet is transmitted (504) to the UE 200, the UE 200 PDCP receive entity 208 receives (506) the packet successfully thereof is provided to upper layer entity 204. Before providing the packet to upper layer 204, the SFN and sf number at which the packet has completed the PDCP receive processing is estimated. The latency in the DL communication is calculated (506) as the time different between the "SFN, sf" at which the receive PDCP processing is completed and the "SFN, sf" present in the received PDU. The DL latency can be calculated by the UE 200 (based on time of reception of time stamped packet) or by the apparatus 100 based on the received SFN, sf information and generates a latency report. Further, the UE 200 trigger for sending (508) the latency report is satisfied, then the UE transmits (510) time DL latency report to apparatus 100. For example, in the DL latency calculation is the actual method of determining the DL latency is detailed in conjunction with FIG. 6. The reporting of the calculated DL latency to the apparatus 100 is detailed in conjunction with FIGS. 7a-7c. The apparatus 100 on receiving (512) the latency report will evaluate the latency report and performs corrective actions.

Figure 6:
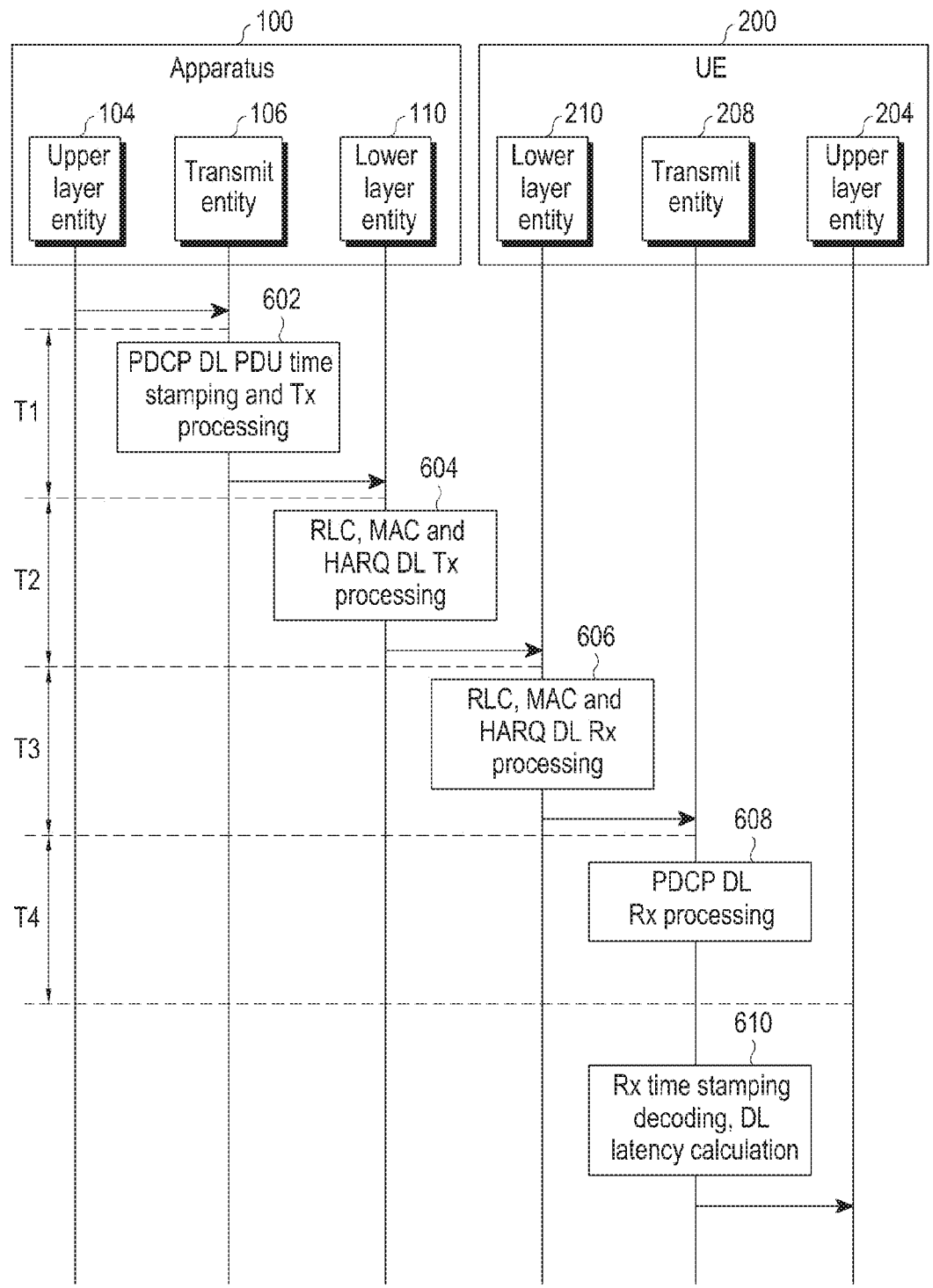
FIG. 6 is a sequence diagram illustrating steps for determining the DL by means of the DL PDU time stamping, according to embodiments as disclosed herein.

The FIG. 6 is a sequence diagram illustrating steps for determining the DL by means of the DL PDU time stamping, according to embodiments as disclosed herein.

T1 is the timeframe at which the PDCP data arrival for the DL transmission from other apparatus/network nodes/the upper layer entity 104 to the time taken for forming PDCP PDU and transmitting it to the lower layer entity 110 (i.e., lower PDCP SAP/RLC). During the time frame of the T1, along with the regular PDCP transmission PDU processing, the PDCP transmit entity 106 time stamps (602) the DL PDU with the reference time value (e.g. SFN and sf number at which the packet arrived from upper layer entity 104) and then the time stamped PDU is provided to the lower layer entity 110. Further, the RLC, the MAC and the PHY processing is performed (604) following which the time stamped PDU is transmitted over the air interface to the UE 200 during a time frame T2. The time frame T2 also includes the MAC PDU formation, the HARQ procedures, and other PHY processing is involved in preparing the DL transport block for transmission. T3 is the time frame where the UE 200 receives the transmitted packet and completes the PHY, the MAC and the RLC processing (606) and provides the PDU packet to upper layer entity/PDCP 204. Further, T3 includes the HARQ reordering procedure, HARQ retransmissions, the PHY layer processing, MAC de-multiplexing, RLC SDU formation, RLC reordering and other related L2 procedures. T4 is time at which the reception of the packet at the UE 200 PDCP/PDCP lower SAP/RLC upper SAP to the time at which the packet is provided to the upper PDCP upper SAP/upper layer entity 204 for post PDCP processing (608). During T4, the PDCP Rx entity 208 decodes (610) the time stamped value and calculates the DL latency for the received packet (e.g. SFN, sf at which the Rx entity 208 has completed processing the PDU and the time stamp value added to the PDU). This measured latency is the DL packet transmission latency and will include the delays introduced during T1, T2, T3 and T4 (time taken from the point in time the data arrived at the PDCP Tx entity 106 to the point in time at which the packet is provided to upper layer entity 204 by the PDCP Rx entity 208).

Unlike conventional systems and methods, improvements in service quality can be achieved only if the apparatus 100 is aware of the calculated delay metric/statistics. Therefore, the calculated latency report (for example: DL/UL packet reception latency) is reported to the apparatus 100. The latency report including the calculated DL or UL latency is transmitted by the UE 200 to the apparatus 100 in one of the following ways:

The first UL PDCP data PDU following the reception of the time stamped DL PDU.

New PDCP control PDU transmitted in the UL immediately after reception of the DL time stamped PDU.

On receiving a request/command from the apparatus 100 for sending the latency report (e.g., via RRC connection reconfiguration, UE assistance information or the like).

On performing re-establishment (optionally configured by the apparatus 100).

As a part of first status PDU following reception of the time stamped PDU.

Periodically based on the periodicity configured by the apparatus 100. The value reported may either be the latency calculated from the last received time stamped PDU or an average of latencies calculated from the last transmission of last latency report (if any) to the present trigger. Further, when the latency for one or more DL packet(s) exceed a configured threshold latency value.

In an embodiment, for example, the latency can be calculated by the apparatus 100. On satisfying the criteria for reporting the DL latency to the apparatus 100, the UE 200 may report to the apparatus 100 the time stamp at which the PDCP PDU has successfully completed the PDCP receive processing and is ready to be provided to the upper layer(s) entity 204. Further, the apparatus 100 is either aware of the time at which the packet arrived at its PDCP Tx entity 106 from the SGW. Further, by determining the time difference between the apparatus 100 stored values (i.e., the first time unit) and the time stamp (i.e., the second time unit) provided in the report received from the UE 100, the apparatus can calculate the DL latency.

In an embodiment, for example, the latency can be calculated by the UE 200. On receiving a time stamped DL PDU from the apparatus 100, the UE 200 calculates the DL latency by measuring the time difference between the time stamp (second time unit) present in the DL PDU and the time at which UE 200 Rx entity 208 has completed its processing. Further, the UE 200 reports the measured DL communication latency on that bearer/QCI to the network.

Format of the PDCP DL latency report: The DL latency report may be sent either as a part of the PDCP PDU itself or as a part of the RRC message. In the former case, it can either be sent as a new or a part of an existing UL control PDU or as a part of the UL data PDU as illustrated in FIGS. 10A and 10B, FIGS. 11A and 11B and the FIG. 12. The report may either contain the SFN or the sf values at which the time stamped DL PDUs were received (When DL latency is calculated by the apparatus 100) or the calculated latency values in unit of milliseconds (when DL latency calculated by the UE 200).

The actual latency is not reported in all the cases where the SFN and the sf numbers are reported to the apparatus 100. The time stamp of reception is reported to the apparatus 100 to calculate the latency. Alternatively, the UE 200 may calculate the DL latency using the time stamp available in the received PDU and report the calculated latency to the apparatus 100. Under such cases, the DL latency report within the PDCP UL PDU will contain the actual latency (Delay field) instead of the reception time stamp. In order to achieve a delay calculation precision of 1 ms, the UE 200 will determine and report the number of sub-frames between the point of time at which time stamp is added to the PDU and the point of time at which the Rx entity 108 has completed processing the PDU and ready to provide the packet to the upper layer (s) entity 104. For a precision of up to 10 ms, the UE 200 can measure and report the latency in unit of the SFN numbers.

Figure 7A:
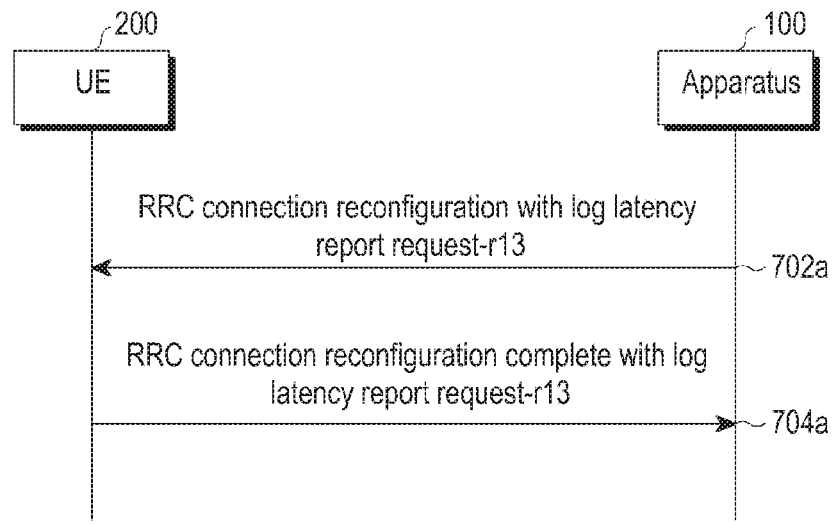
FIGS. 7A-7C illustrate a sequence diagram illustrating various RRC messages for reporting the DL latency report to the apparatus, according to an embodiment as disclosed herein.

The DL packet latency can also be reported as a part of the RRC message in one of the following ways:

If DL latency report is requested through the RRC connection reconfiguration message, the latency report is sent to the apparatus 100 through the associated RRC connection reconfiguration complete message as illustrated in conjunction with FIG. 7a.

Figure 7B:
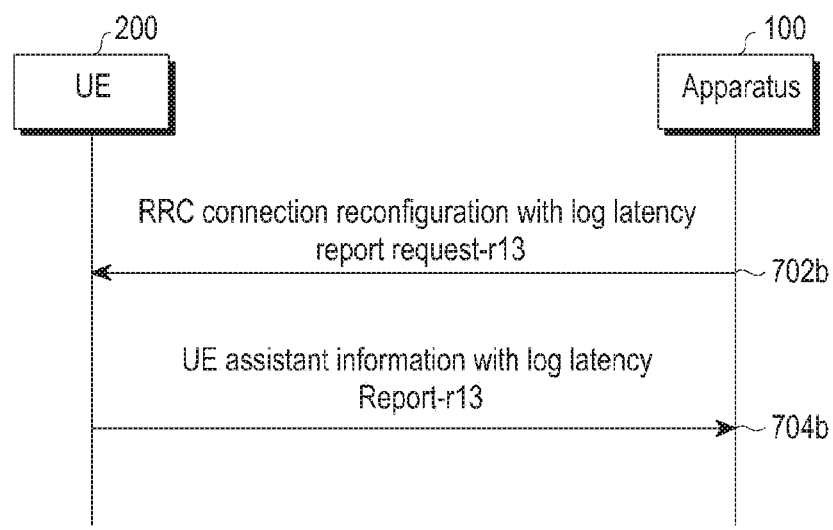
Figure 7C:
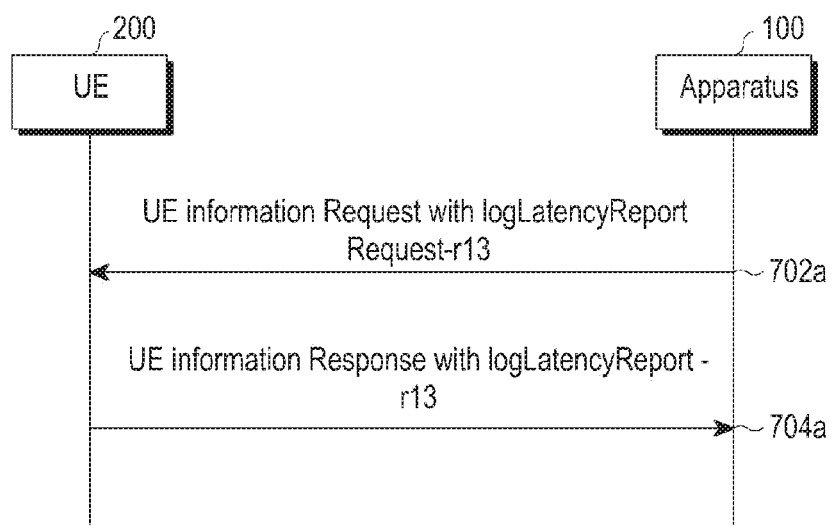

As a part of the UE 200 assistance information as illustrated in conjunction with the FIG. 7c.

If configured by the apparatus 100 to provide the latency reports as a part of RLF recovery mechanisms/re-establishment procedure, the latency report is sent to the apparatus 100 during the RRC connection re-establishment request or complete message.

If the re-establishment to the network/apparatus 100 failed, then the latency report is optionally shared to the apparatus 100 over the next RRC connection setup complete message (if configured by the apparatus 100.

If the DL latency report is requested through the UE 200 information request message, then the report is sent to the apparatus 100 as part of the UE 200n information response as illustrated in conjunction with FIG. 7b.

The FIGS. 7A-7C illustrates a sequence diagram illustrating various RRC messages for reporting the DL latency report to the apparatus 100, according to an embodiment as disclosed herein.

As illustrated in the FIG. 7A, the RRC connection reconfiguration message from the apparatus 100 requests (702a) the UE 200 to log and (or) send the measured DL or the UL latency to the apparatus 100. The UE then sends (704a) the measured DL or the UL latency or the received time stamp to the apparatus over the RRC connection reconfiguration complete message.

As illustrated in the FIG. 7B, the RRC connection reconfiguration message from the apparatus 100 requests (702b) the UE 200 to log and (or) send the measured DL or UL latency to the apparatus 100. The UE 200 after completing the RRC connection reconfiguration procedure successfully transmits (704b) the UE 200 assistance information to the apparatus 200 containing the measured DL or the UL latency or the received time stamp.

As illustrated in the FIG. 7C, the UE 200 information request message from the apparatus 100 requests (702c) the UE 200 to log and (or) send the measured DL or UL latency to the apparatus 100. The UE 200 then sends (704c) the measured DL/UL latency, or the received time stamp to the apparatus 100 over the information response message from the UE 200. The DL or UL latency report may contain, for example, information elements (IEs) which indicate the latency in the DL or the UL for different radio bearers or for a single radio bearer as requested by the network/apparatus 100. If the apparatus 100 requests latency report for a specific bearer, the UE 200 reports the value only for the requested radio bearer. Otherwise, the UE 200 reports the latency for all the activated bearers in order of activation of the same.

| logLatencyReportReq-r13 | |
| --- | --- |
| rb-Identity | [Optional] |
| logLatencyAvailable-r13 | [TRUE] |
| dlLatencyRBid | AbsoluteTimeInfo-r13 |
| AbsoluteTimeInfo-r13 | bit string (max DL delay) |

Figure 8:
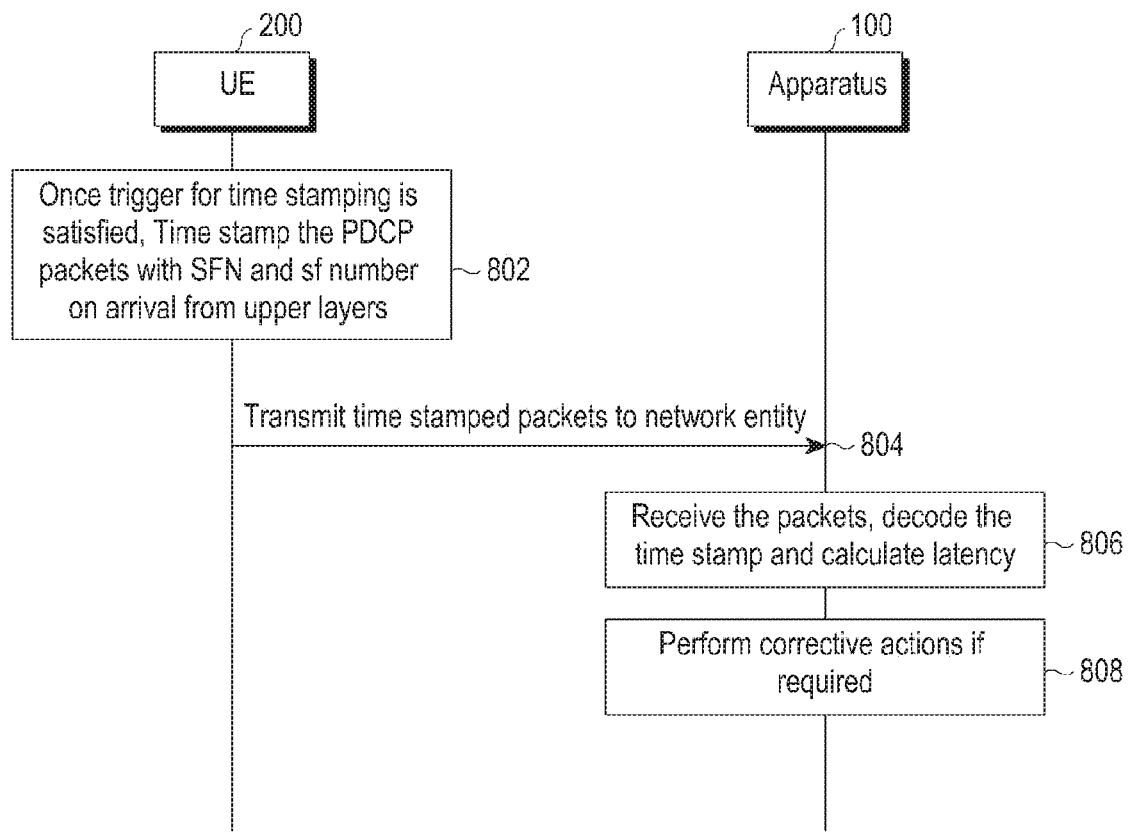
FIG. 8 is a sequence diagram illustrating various signaling messages involved in the UL latency determination by time stamping, according to embodiments as disclosed herein.

FIG. 8 is a sequence diagram illustrating various signaling messages involved in the UL latency determination by time stamping, according to embodiments as disclosed herein.

As provisioned in present specification of the 3GPP TS 36.314, latency measurement is done at the apparatus/eNB 100 and hence it does not cater to the UL latency measurement. The packet delay in the UL direction is measured/calculated as the time difference between the first time unit and the second time unit (i.e., "point in time when the PDCP SDU is provided to upper layer entity 104 by the PDCP receiver entity 108 at the apparatus 100" and the "point in time when PDCP SDU arrives at the PDCP Tx 206 at the UE 200"). This latency measurement takes into account for the HARQ retransmissions, reordering delay, the RLC retransmissions/RLC processing time and PDCP processing time as well. Further, the latency is calculated by the apparatus 100.

Referring to the FIG. 8, when the PDCP SDU (i.e., packets) arrives at the transmit entity 206, the packets are time stamped (802) with a known or reference value. The PDCP SDU/PDU is time stamped with the value of SFN and sf number at which the packet is arrived from the upper layer(s) entity 204. Further, the transmit entity 206 transmits (804) the time stamped packets to the apparatus 100. Further, the Rx entity 108 (i.e., eNB PDCP) receives the time stamped packets and provides to the upper layer entity 104 of the apparatus 100. Before providing the packet to the upper layer(s) entity 104, the SFN and sf number at which the packet has completed PDCP receive processing is estimated. Further, the latency in the UL communication is calculated (806) as the time different between the "SFN, sf" at which the receive PDCP processing is completed and the "SFN, sf" present in the received UL PDU. The latency can be calculated by the apparatus 100 based on the received "SFN, sf" information available in the received UL packet. Further, the apparatus 100 is configured to perform (1008) corrective actions if required.

In an example, when the packets are received at the UE 200, the transmit entity 206 triggers for time stamping of the UL PDCP packet: The Time stamping of the UL PDCP PDU results in added overhead to the actual payload. Therefore, it is not always desirable to time stamp each of the PDCP UL PDU. The time stamping decision for a PDCU may depend on several factors and the triggers leading to decide the time stamping of the PDU as are provided below:

Every UL packet
First UL packet on the bearer/QCI
For the zeroth DL PDCP SN
Periodic time stamping of SDU/PDU based on a defined periodicity
When first UL PDCP SDU is discarded from transmission
When UL PDCP SDU discard at the apparatus 100, the PDCP Tx entity 106 increases over a threshold
When the HARQ ACK is not received after a defined number of attempts/retransmissions.
When there is an RTP/RTCP timeout
When the DL status PDU is received
When RRC/PDCP has been explicitly signaled by the network/apparatus 100 to time stamp
When requested by the apparatus 100 as part of the RRC message (e.g. LatencyReportReq-r13, ulTimestampReq-r13 etc.).

Unlike the DL case, there is no need for the UE 200 to send a separate latency report to the apparatus 100 as the time stamped PDU is transmitted in the UL using which the apparatus 100 can calculate the delay involved. A PDCP UL PDU can be time stamped as a part of the UL data PDU or as a new or part of UL control PDU as illustrated in FIGS. 10A and 10B, FIGS. 11A and 11B and the FIG. 12 or as a part of the RRC message as illustrated in the FIGS. 7a-7c.

Figure 9:
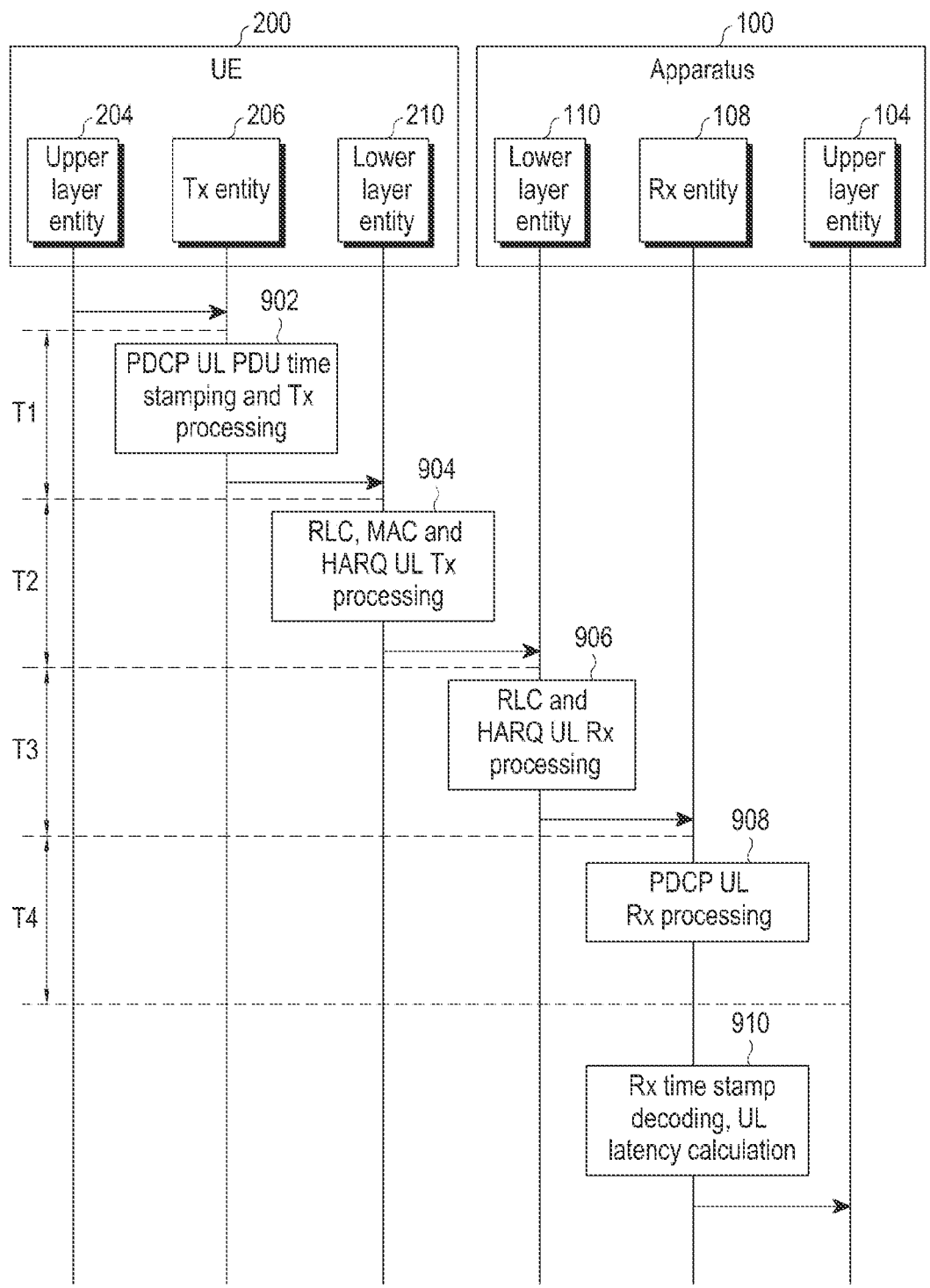
FIG. 9 is a sequence diagram illustrating steps for determining the UL latency by means of the UL PDU time stamping, according to embodiments as disclosed herein.

FIG. 9 is a sequence diagram illustrating steps for determining the UL latency by means of the UL PDU time stamping, according to embodiments as disclosed herein.

T1 is the time at which the PDCP data arrival for the UL transmission from upper layer entity 204 to the time taken for forming the PDCP PDU and transmitting to the lower layer entity 210 (i.e., lower PDCP SAP/RLC). During the time frame of T1, along with the regular PDCP transmission PDU processing, the PDCP transmit entity 206 also time stamps (902) the UL PDU with a reference time value (e.g. SFN and sf number at which the packet arrived from upper layer entity 204) and then provided to the lower layer entity 210. Further, the RLC, the MAC and the PHY processing is performed (904) and then the packet is transmitted over the air to the apparatus 100 during the time frame T2. The time frame T2 also includes MAC PDU formation (multiplexing and scheduling), HARQ procedures, and other PHY processing involved in preparing the DL transport block for transmission. The T2 also includes the over the air propagation delay between the UE 200 transmission and the apparatus 100 reception. T3 is the time frame where the apparatus 100 receives the transmitted packet and completes (906) Physical layer (PHY), medium access control (MAC) layer and RLC processing and provides the packet to the upper layer entity/PDCP 104. T3 includes HARQ reordering procedure, HARQ retransmissions, the PHY layer processing, MAC de-multiplexing, RLC SDU formation, RLC reordering and other related L2 procedures. T4 is the time at which the reception of the packet at the apparatus 100 PDCP/PDCP lower Service Access Point (SAP)/RLC upper SAP to the time at which the packet is provided to PDCP upper SAP/upper layer entity 104 for post PDCP processing (908). During T4, the receiver entity/Rx PDCP entity 108 at the apparatus 100 decodes the time stamped value and calculates (910) the UL latency for the received packet (e.g. SFN, sf at which the Rx entity 108 has completed processing the PDU and the time stamp value added to the PDU). This measured latency is the UL packet transmission latency and will include the cumulative delays introduced during T1, T2, T3 and T4.

In another embodiment, the method for determining the UL latency without time stamping PDCP PDU. In the UL, as the latency calculation is done at the apparatus 100, it is not always necessary to time stamp on the UL packet for estimating the latency and other alternative methods are possible as well. If the time at which the data arrives at the UE 200 transmit entity/Tx PDCP entity 206 can be estimated by the apparatus 100, then it is not required to time stamp the packets. However, the latency will be different for different bearers as the UL scheduling takes the logical channel priority into account.

Format of the time stamped PDU and the latency report: PDCP PDU time stamping (for reference timing for DL/UL latency calculation) for the latency calculation or the latency reporting (UE 200 assisted time information to apparatus 100 for the DL latency calculation at the apparatus 100) can be done either as a new or part of an existing control PDU or as a part of data PDU as detailed in conjunction with the FIGS. 10A-10B, the FIGS. 11A-11B and the FIG. 12.

The FIGS. 10A-10B illustrates different PDU formats using which the PDCP data PDU are time stamped with reference value (e.g. the SFN and sf number at which the packet arrived at the PDCP from upper layer entity 202). The time stamp and latency report PDU contains the following fields:

The transmit SFN, sf [time stamped PDU] is a part of status PDU or as a new PDP control PDU or PDCP data PDU.

New bit 'L' (Latency) is introduced in the header which indicates the presence of time stamping in the PDU.

The time stamp includes a 10 bit field for SFN number followed by a 4 bit field for frame number.

A new PDU Type for reporting Latency may optionally be introduced as shown in table 2 below [Valid on Control PDU].

The new fields may either be inserted before the PDU SN or after the PDU SN.

Reporting of the UL Latency to the apparatus 100: The UL packet latency which includes T1 and T2 as illustrated in the FIG. 9 can also be reported as a part of the RRC message. It may be indicated as a response to RRC connection reconfiguration message received from the apparatus 100 or as a part of the UE 200 assistance information, the UE 200 information response or the like. The T1 and T2 includes the PDCP queuing delay which is the time between the transmission of the UL packet over the air interface to the apparatus 100 and the time at which the packet arrived at the UE 200 to transmit PDCP entity for UL transmission. The UL latency report may contain IEs which indicate latency in UL for different radio bearers or for a single radio bearer as requested by the apparatus 100. If the apparatus 100 requests the latency report for a specific bearer, the UE 200 reports the value only for the requested radio bearer. Otherwise, the UE 200 reports the latency for all the activated bearers in order of activation of the same. The report will also have the UL delay which is calculated by means of ULPDU time stamping.

| logLatencyReportReq-r13 | |
|---|---|
| rb-Identity | [Optional] |
| UL delay | |
| logLatencyAvailable-r13 | [TRUE] |

-continued

| logLatencyReportReq-r13 | |
|---|---|
| dlLatencyRBid | AbsoluteTimeInfo-r13 |
| NumPacketsAboveThreshold-r13 | bit string(max Discard Packets) |
| AbsoluteTimeInfo-r13 | bit string (max DL delay) |

The FIG. 10A illustrates the time stamped data PDU with a 12 bit PDCP Sequence Number (SN). If the L bit is set to "1", then this indicates that the PDCP PDU carrying the SFN and SF values after PDCP SN. Here Oct 3 and Oct 4 are carrying SFN and SF values along with some reserved value and are byte aligned. These SFN and SF value can be considered as part of PDCP header and may not be ciphered as this can help in calculating the latency. Alternatively, another approach it can be treated as normal data and can be ciphered as per existing procedure.

The FIG. 10B illustrates the time stamped data PDU with a 7 bit PDCP SN. If the L bit is set to 1 then immediately following bit/field carries SFN/SF value else if this bit is set to "0", then next immediate bit is considered to be data. Another way to interpret the PDCP PDU is if the L bit is set as "0" then next 2 octets does not carry any information and data starts from after 2 octets itself. The same format can be applicable for 12 bit or 15 bit PDCP SN.

Figure 11A:
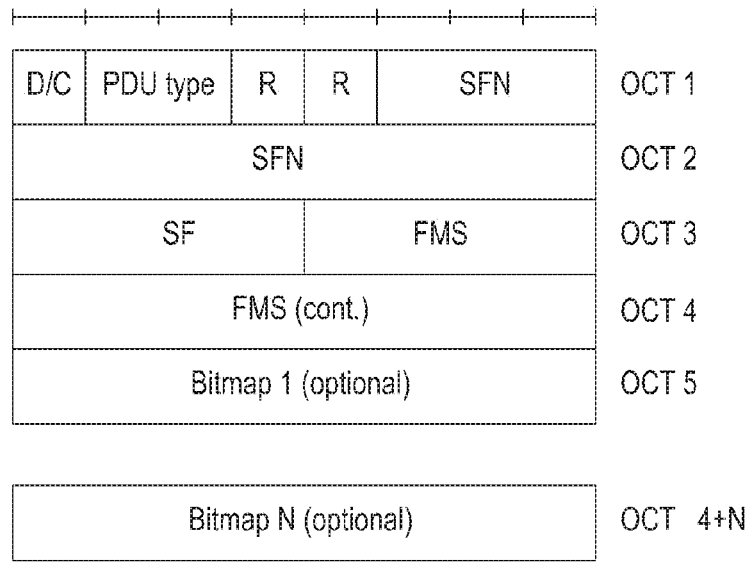
FIGS. 11A-11B illustrate different PDU formats using which the PDCP status PDU are time stamped with reference time value, according to embodiments as disclosed herein.
Figure 11B:
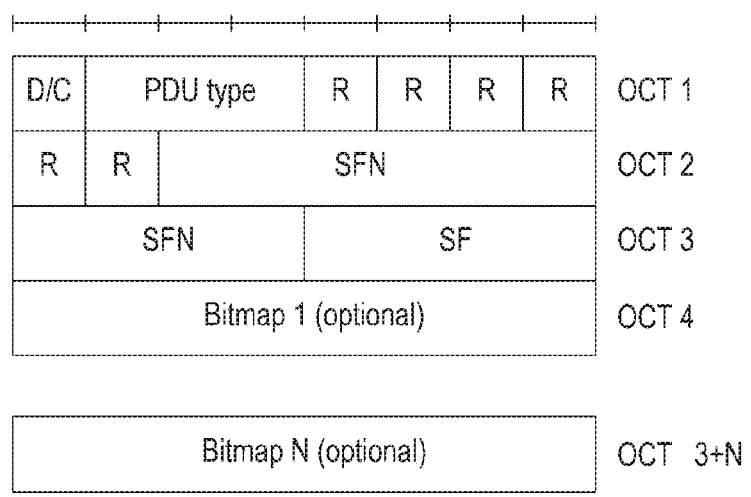

FIGS. 11A-11B illustrates different PDU formats using which the PDCP status PDU are time stamped with reference time value, according to embodiments as disclosed herein.

The FIG. 11A illustrates time stamp addition to the status PDU for PDCP with SN of 12 bits. Such status reports may be referred as an extended status report. First Missing Sequence number (FMS) field is present in the status report in addition to the 10 bit SFN and 4 bit SF fields. A unique PDU type field (as shown in table 2) at the beginning of the status report indicates if this is an extended status report carrying time stamp/latency report in addition to the status report. These new fields may be inserted in any order prior to addition of the bitmap fields.

The FIG. 11B illustrates time stamp addition to a status PDU for PDCP with SN of 15 bits. Such Status reports may also be referred to as an extended status report. There is no FMS field in this type of status report. A unique PDU type field (as shown in table 2) at the beginning of the status report indicates if this is an extended status report carrying time stamp/latency report in addition to the status report. These new fields may be inserted in any order prior to addition of the bitmap fields.

FIG. 12 illustrates the new PDCP control PDU introduced for the sole purpose of indicating the time stamp to the UE 200, according to an embodiment as disclosed herein. This time stamped control PDU will include a unique PDU type which indicates that the PDU is a time stamp control PDU as illustrated in the Table 2. The PDU contains a 10 bit SFN filed, 4 bit SF field and remaining reserved bits for byte alignment. In all these cases, the time stamped PDU may either carry only SFN and SF or it may additionally carry PDCP SN corresponding to that SFN, SF.

TABLE 2

PDCP PDU Type values

| Bit | Description |
|---|---|
| 000 | PDCP status report |
| 001 | Interspersed ROHC feedback packet |

TABLE 2-continued

PDCP PDU Type values

| Bit | Description |
| --- | --- |
| 010 | PDCP time stamp Control PDU |
| 011 | PDCP extended Status Report |
| 100 | PDCP UL Packet discard report Control PDU |
| 101-111 | reserved |

Triggers and reporting procedure for UL Packet Loss metrics

The UL packet loss or drop or discard can happen due to poor resource allocation/scheduling or poor radio conditions. A packet is discarded or lost from transmission queue if there are no resource allocated for it within a defined time period (time period is set based on the expected QoS). Packet discards lead to poor quality of service and can eventually even lead to dropping of the MMTEL Voice/video call (due to excessive and continuous discards). Packet loss visible at Access Stratum shall be measured. For DL as the data pending for transmission is available at the apparatus 100 and the scheduling decisions are also taken by the apparatus 100, it is possible to estimate the packet discard (if any) and hence can take corrective action to minimize the same. However, in the UL direction, the data pending for transmission is available at UE 200, but the scheduling decisions are taken by the apparatus 100. Therefore, the apparatus 100 is not aware of the packet discard statistics and hence cannot take any corrective/preventive actions to minimize it. The serving apparatus 100 need to be educated with packet discard statistics for the UL data, so that the apparatus 100 can make appropriate scheduling decisions to minimize the number of discards thereby improving the service quality.

Figure 13:
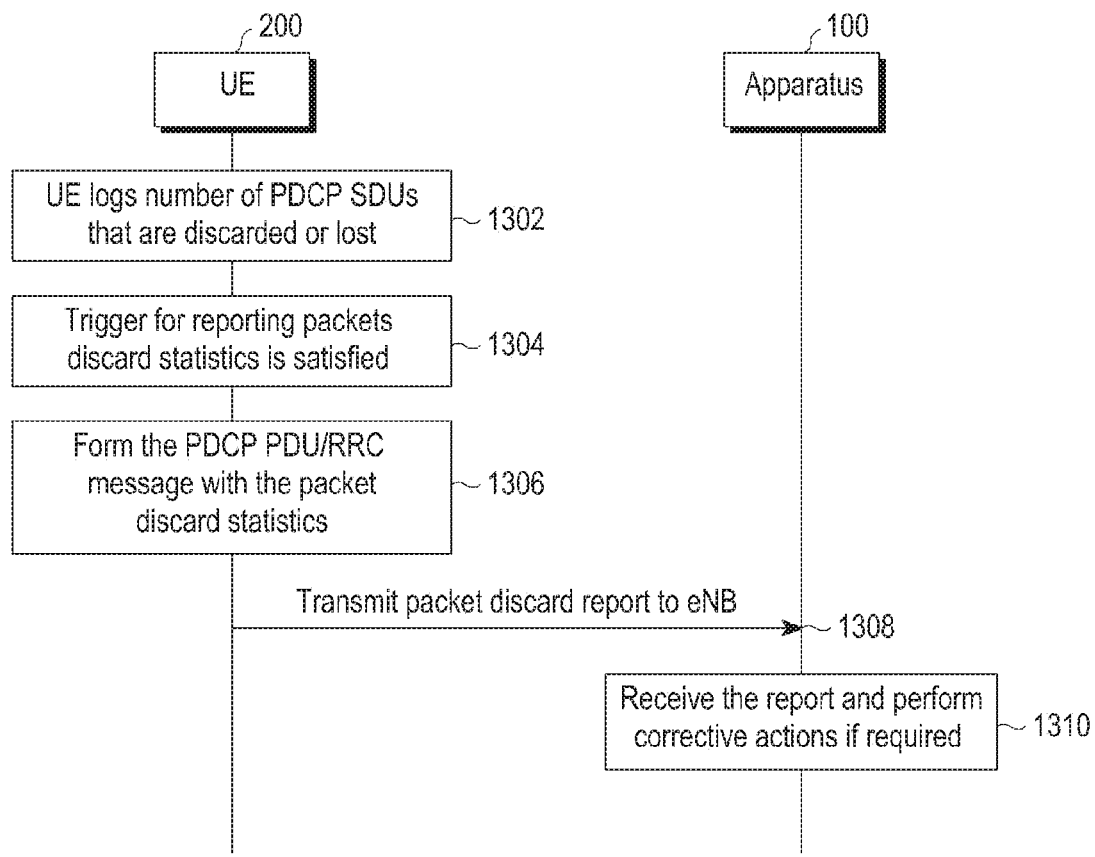
FIG. 13 is a sequence diagram illustrating various steps involved in reporting discarded packets to the apparatus, according to embodiments as disclosed herein.

FIG. 13 is a sequence diagram illustrating various steps involved in reporting discarded packet to the apparatus 100, according to embodiments as disclosed herein.

Due to several factors including poor resource allocation/scheduling, there are packets discarded from the transmission. A packet is discarded from the transmission if there is no resource allocated for the packet within a defined time period (time period is set based on the expected QOS). The packet discards lead to poor quality of service and can eventually lead to dropping of the MMTEL Voice/video call (due to excessive and continuous discards).

In the DL direction, as the data pending for the transmission is available at the apparatus 100 and the scheduling decisions are also taken by the apparatus 100, it is possible to estimate the packet discard (if any) and hence can take corrective action to minimize the same. However, in the UL direction, the data pending for the transmission is available at the UE 200, but the scheduling decisions are taken by the apparatus 100. Therefore, the apparatus 100 is not aware of the packet discard statistics and hence cannot take any corrective/preventive actions to minimize it.

In the DL, the apparatus 100 is aware of the number of packets discarded and can take the necessary corrective actions. However, in the UL the apparatus 100 is not aware of the number of packets discarded from the transmission and hence cannot take any correction measures. Only the UE 200 is aware of this statistic but cannot improve the service quality with this knowledge. In order to improve the service quality, the serving network/apparatus 100 has to be educated with these statistics. If the apparatus 100 is aware of the packet discard statistics, then the apparatus 100 can make appropriate scheduling decisions to minimize the number of discards thereby improving the service quality.

Once the trigger condition for reporting the UL packet discard statistics to the apparatus 100 is satisfied, the UE 200 forms the packet discard report and send it over the air interface to the apparatus 100. The apparatus 100 on receiving the report will perform corrective actions (if required) to overcome the packet discard anomaly.

At step (1302): Logging the number of discarded PDU/SDU: The UE 200 logs the number of PDCP PDU lost or discard. The discard can be due to poor resource allocation or due to PDCP discard timer or due to error condition like RLF, re-establishment etc. The UE 200 can also log information like number of PDCP PDU that have been discarded i.e. packets which are processed at PDCP by assigning PDCP SN and number of PDCP SDU i.e. packets which are still in transmission queue and yet to be processed.

At step (1304): Triggers for reporting the UL packet discards: To take appropriate scheduling decisions to minimize the packet discards in the UL, the apparatus 100 has to be made aware of the discard statistics. The apparatus 100 or the UE 200 itself can define trigger to send this status report to LTE apparatus 100. This can be achieved in the following ways:

Re-establishment procedure which can occur due to handover or any other error condition like Radio Link Failure (RLF), Random Access Channel (RACH) failure or the like.

Apparatus 100 can request the PDCP discard statistics in any of the RRC or the non-access stratum (NAS) message.

Apparatus 100 can configure the reporting of these statistics on periodic basis, the UE 200 can run the timer and report these after periodic timer expiry.

The UE 200 can report this if the number of discarded packets is above a defined threshold as configured by the Apparatus 100. This threshold can be provided in any of the RRC or the NAS message and can be configured as per the QCI or per bearer or per Logical channel group. This event based can be controlled through status prohibit timer so that the UE 200 should not end up in sending multiple reports.

The UE 200 can report it if the Real-time Transport Protocol (RTP)/Real-Time Transport Control Protocol (RTCP) timeout has occurred.

The UE 200 can report it whenever existing MDT measurements have been reported like during the RLF or the RACH or handover procedure.

Can be reported periodically following the first discarded packet.

At step (1306): Method and format to report the UL packet discard statistics to the apparatus 100: The UL packet discarded may be sent either as a part of the PDCP PDU itself or as a part of the RRC message. In the former case, it can either be sent as a new or a part of an existing UL control PDU or as a part of the UL data PDU. The report shall contain the number of packets discarded during the time window under consideration (time window is predefined or the apparatus 100 configured). Alternatively, the report shall contain the total number of packets discarded during the PDCP session since establishment/re-establishment of the PDCP entity. The report will also contain number of the PDCP PDU that have been discarded i.e. packets which are processed at the PDCP by assigning PDCP SN and the number of PDCP SDU i.e. packets which are still in transmission queue and yet to be processed. The example format for PDCP control PDU is illustrated in conjunction with the FIGS. 14A and 14B. The control PDU will have a new unique PDU type for identifying the PDCP packet discard statistics report control PDU as shown in Table 2.

The FIG. 14A illustrates a method where the number of UL packets discarded from transmission is logged separately for the packets which are assigned PDCP SN and for packets which are not assigned PDCP SN. The 12 bit PDCP SN is considered and the fields for number of the discarded packets are considered of the same size as that of the SN.

The FIG. 14B illustrates a method by which there is no separate fields to indicate to the number of packets discarded with the assigned SN or without the assigned SN. The 12 bit PDCP SN is considered and the fields for the number of discarded packets are considered of the same size as that of the SN.

Figure 15A:
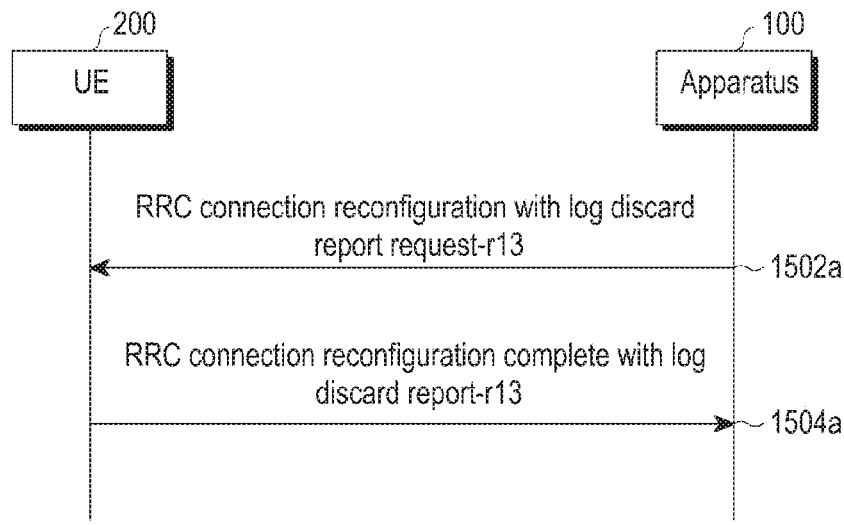
FIGS. 15A-15C are sequence diagrams illustrating UL discard packet statistics are reported as a part of an RRC message, according to embodiments as disclosed herein.
Figure 15B:
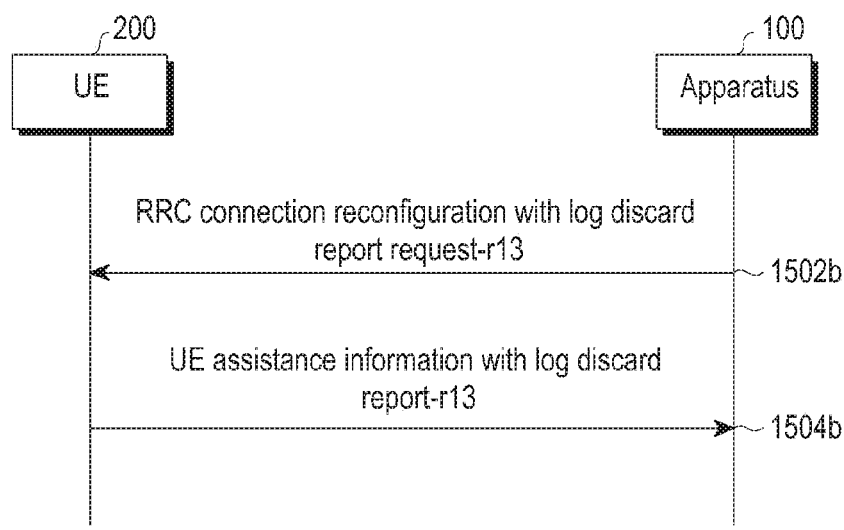
Figure 15C:
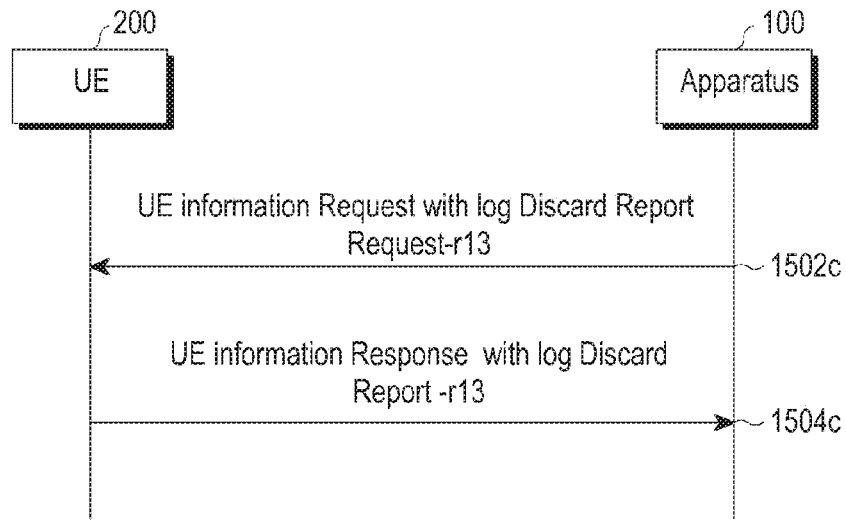

FIGS. 15A-15C are sequence flow diagrams illustrating UL discard packet statistics are reported as a part of the RRC message, according to embodiments as disclosed herein.

The UL discard packets report/statistics can also be reported as a part of the RRC message in one of the following ways:

If UL packet discard report is requested (1502a) through the RRC connection reconfiguration message, the report (1504b) is sent to the apparatus/EUTRAN 100 through the associated RRC connection reconfiguration complete message as illustrated in the FIG. 15a.

As a part of the UE 200 assistance information as illustrated in the FIG. 15B.

If configured by the apparatus 100 to provide (1502b) the packet discard reports as a part of RLF recovery mechanisms/re-establishment procedure, the packet discard report is sent (1504b) to apparatus 100 during RRC connection re-establishment request or complete message.

If the re-establishment to the network/apparatus 100 failed, then the packet discard report is optionally shared to the apparatus 100 over the next RRC connection setup complete message (if configured by the apparatus 100).

If the discard report is requested (1502c) through the UE 200 information request message, the report is sent (1504c) over the UE 200 information response message as illustrated in FIG. 15C.

The discard report may contain any one of the following contents:

Number of packets discarded per bearer.

Rate (percentage) of packets discarded over a time window per bearer.

Number or rate of packets discarded from transmission since the last packet discard report sent to the apparatus/eNB 100.

Separate indications for number of packets discarded with assigned PDCP SN and number of packets discarded without assigned the PDCP SN.

Figure 16:
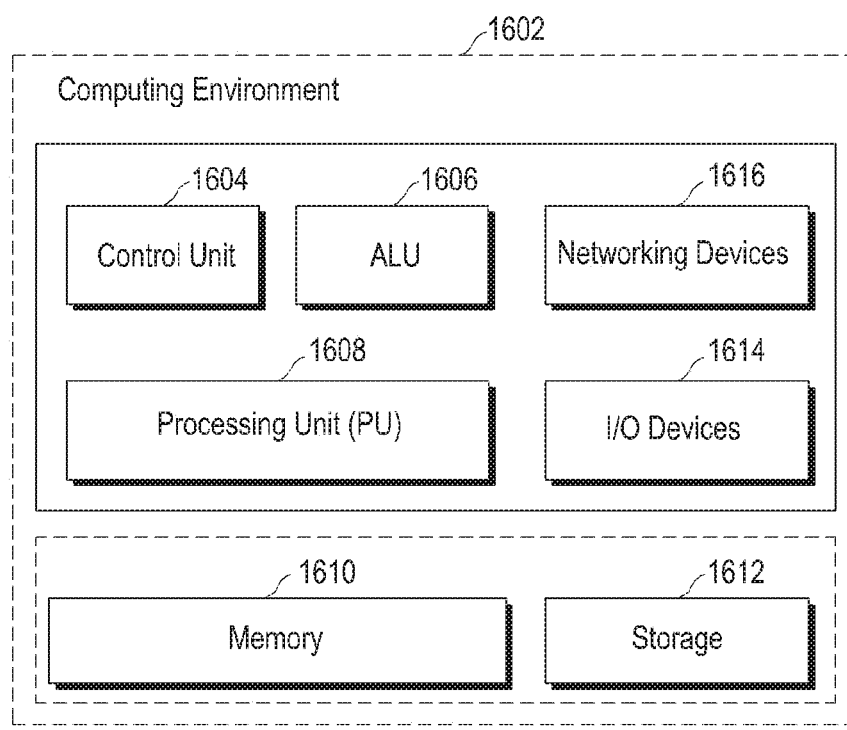
FIG. 16 illustrates a computing environment implementing the method for reporting latency of the packet transmission in the communication network, according to an embodiment as disclosed herein.

FIG. 16 illustrates a computing environment implementing the method for reporting latency of the packet transmission in the communication network, according to an embodiment as disclosed herein. As depicted the computing environment 1602 comprises at least one processing unit 1608 that is equipped with a control unit 1604 and an Arithmetic Logic Unit (ALU) 1606, a memory 1610, a storage unit 1612, plurality of networking devices 1816 and a plurality Input output (I/O) devices 1614. The processing unit 1608 is responsible for processing the instructions of the algorithm. The processing unit 1608 receives commands from the control unit 1608 in order to perform its processing. Further, any logical and arithmetic operations involved in the execution of the instructions are computed with the help of the ALU 1606.

The embodiments disclosed herein can be implemented through at least one software program running on at least one hardware device and performing network management functions to control the elements. The elements shown in FIGS. 1 through 16 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for reporting latency of an uplink (UL) packet transmission in a communication network, the method comprising:

receiving, by a user equipment (UE), configuration information including a request message for reporting time information related to the UL packet transmission from a network entity, wherein the configuration information is used for identifying latency information;

identifying, by the UE, information including an arrival time of the UL packet at which the UL packet arrived at a transmit entity of the UE from a packet data convergence protocol (PDCP) upper service access point (SAP) of the UE in response to the request message; and transmitting, by the UE, the UL packet including the information to the network entity, wherein the latency information includes hybrid automatic repeat request (HARQ) retransmissions, reordering delay, radio link control (RLC) retransmissions, RLC processing time, and PDCP processing time.

2. The method of claim 1, wherein an event is triggered if the UL packet is a first UL packet related to a quality of service (QoS) class identifier (QCI).

3. The method of claim 1, wherein an event is triggered based on receiving a radio resource control (RRC) connection reconfiguration message and the UL packet is transmitted through an RRC connection reconfiguration complete message.

4. The method of claim 1, wherein the configuration information is received periodically.

5. A method for identifying latency of an (UL) packet transmission in a communication network, the method comprising:

transmitting, by a network entity to a user equipment (UE), configuration information including a request message for reporting time information related to the UL packet transmission;

receiving, by the network entity from the UE, the UL packet including information which includes an arrival time of the UL packet at which the UL packet arrived at a transmit entity of the UE from a packet data convergence protocol (PDCP) upper service access point (SAP) of the UE in response to the request message; and identifying the latency information based on a difference between the arrival time and a completed processing time of the UL packet at the network entity,
wherein the latency information includes hybrid automatic repeat request (HARQ) retransmissions, reordering delay, RLC retransmissions, RLC processing time, and PDCP processing time.

6. The method of claim 5, wherein the network entity transmits a radio resource control (RRC) connection reconfiguration message and receives the UL packet including the information after completing an RRC connection reconfiguration procedure.

7. A user equipment (UE) reporting latency of an uplink (UL) packet transmission in a communication network, the UE comprising:
   a transceiver; and
   a controller configured to:
      receive configuration information including a request message for reporting time information related to the UL packet transmission from a network entity, wherein the configuration information is used for identifying latency information;
      identify information including an arrival time of the UL packet at which the UL packet arrived at a transmit entity of the UE from a packet data convergence protocol (PDCP) upper service access point (SAP) of the UE in response to the request message; and
      control the transceiver to transmit the UL packet including the information to the network entity,
      wherein the latency information includes hybrid automatic repeat request (HARQ) retransmissions, reordering delay, radio link control (RLC) retransmissions, RLC processing time, and PDCP processing time.

8. The UE of claim 7, wherein an event is triggered if the UL packet is a first UL packet related to a quality of service (QoS) class identifier (QCI).

9. The UE of claim 7, wherein an event is triggered based on receiving a radio resource control (RRC) connection reconfiguration message and the UL packet is transmitted through an RRC connection reconfiguration complete message.

10. The UE of claim 7, wherein the event is triggered periodically.

11. An apparatus for identifying latency of an uplink (UL) packet transmission in a communication network, the apparatus comprising:
    a transceiver; and
    a controller configured to:
       control the transceiver to transmit, to a user equipment (UE), configuration information including a request message for reporting time information related to the UL packet transmission;
       receive, from the UE, the UL packet including information which includes an arrival time of the UL packet at which the UL packet arrived at a transmit entity of the UE from a packet data convergence protocol (PDCP) upper service access point (SAP) of the UE; and
       identify latency information that is based on a difference between the arrival time and a completed processing time of the UL packet at the apparatus,
       wherein the latency information includes hybrid automatic repeat request (HARQ) retransmissions, reordering delay, radio link control (RLC) retransmissions, RLC processing time, and PDCP processing time.

12. The apparatus of claim 11, wherein the apparatus transmits a radio resource control (RRC) connection reconfiguration message and receives the UL packet including the information after completing an RRC connection reconfiguration procedure.

* * * * *